United States Patent [19]

Metz et al.

[11] Patent Number: 5,355,131
[45] Date of Patent: Oct. 11, 1994

[54] AIRCRAFT LANDING LIGHT

[75] Inventors: Donald J. Metz, N. Hampton; Michael A. Forhan, Urbana, both of Ohio

[73] Assignee: Grimes Aerospace Company, Urbana, Ohio

[21] Appl. No.: 958,023

[22] Filed: Oct. 7, 1992

[51] Int. Cl.$^5$ ............................................. B64D 47/06
[52] U.S. Cl. .................................. 340/981; 362/63; 362/66
[58] Field of Search ............... 340/433, 686, 687, 981, 340/953, 945, 982; 362/62, 63, 65, 66; 315/82

[56] References Cited

U.S. PATENT DOCUMENTS

| 2,124,346 | 7/1938 | Grimes . | |
|---|---|---|---|
| 2,510,818 | 6/1950 | Grimes | 362/63 |
| 2,859,331 | 11/1958 | Grimes | 362/63 |
| 4,165,501 | 8/1979 | Bongort et al. | 340/686 |
| 4,486,818 | 12/1984 | Hashimoto et al. | 362/65 |
| 4,866,426 | 9/1989 | Evans et al. | 340/687 |
| 4,983,949 | 1/1991 | Wicker | 340/433 |
| 5,132,662 | 7/1992 | Burch | 340/433 |

*Primary Examiner*—Brent Swarthout
*Attorney, Agent, or Firm*—Standley & Gilcrest

[57] ABSTRACT

A landing light is provided for mounting on an aircraft. Electronic control devices actuate drive elements to pivot a lamphead over a range of operational positions. The electronic control device having a magnetic switch array actuated by magnets connected to the drive elements.

13 Claims, 6 Drawing Sheets

FROM FIG. 6A

AIRCRAFT LANDING LIGHT

BACKGROUND AND SUMMARY OF THE INVENTION

The present invention is concerned generally with an aircraft landing light, and more particularly, with an aircraft landing light that may be pivoted by drive means over a range of angular operational positions.

Aircraft generally have lights mounted thereon for providing illumination during take-off and landing when visibility is reduced by darkness or adverse weather conditions. These lights generally pivot by drive means from a retract position to an extended position that provides optimum illumination during take-off and landing. These lights may also pivot to an additional extended position that provides optimum illumination for taxiing.

Existing landing lights generally employ electromechanical switch means to direct a light from one operational position to another. These electromechanical switch means may be imprecise, unreliable and difficult to maintain.

Hence a need exists for a landing light having precise, reliable and easily maintained switch means to direct the light from one operational position to another. Ideally, such a light would provide an extended position that provides optimum illumination for taxiing.

The present invention provides a landing light designed to satisfy one or more of the aforementioned objectives. The present invention provides electronic (Hall-effect) switch means to direct the light from one operational position to another. The present invention also provides an extended position that provides optimum illumination for taxiing.

The present invention provides an aircraft landing light having a base for mounting to an aircraft and a lamphead pivotally mounted to the base. The lamphead partially encloses conventional lamp means. The lamphead is connected to drive means.

A select switch, accessible to the pilot, selects a mode corresponding to a desired operational position of the lamphead. The select switch may actuate control means preferably including a magnetic switch array and a control circuit. When the switch array detects that the lamphead is not in the desired position, the control circuit actuates the drive means, pivoting the lamphead toward the desired position.

DESCRIPTION OF PREFERRED EMBODIMENT(S)

Figure 1:
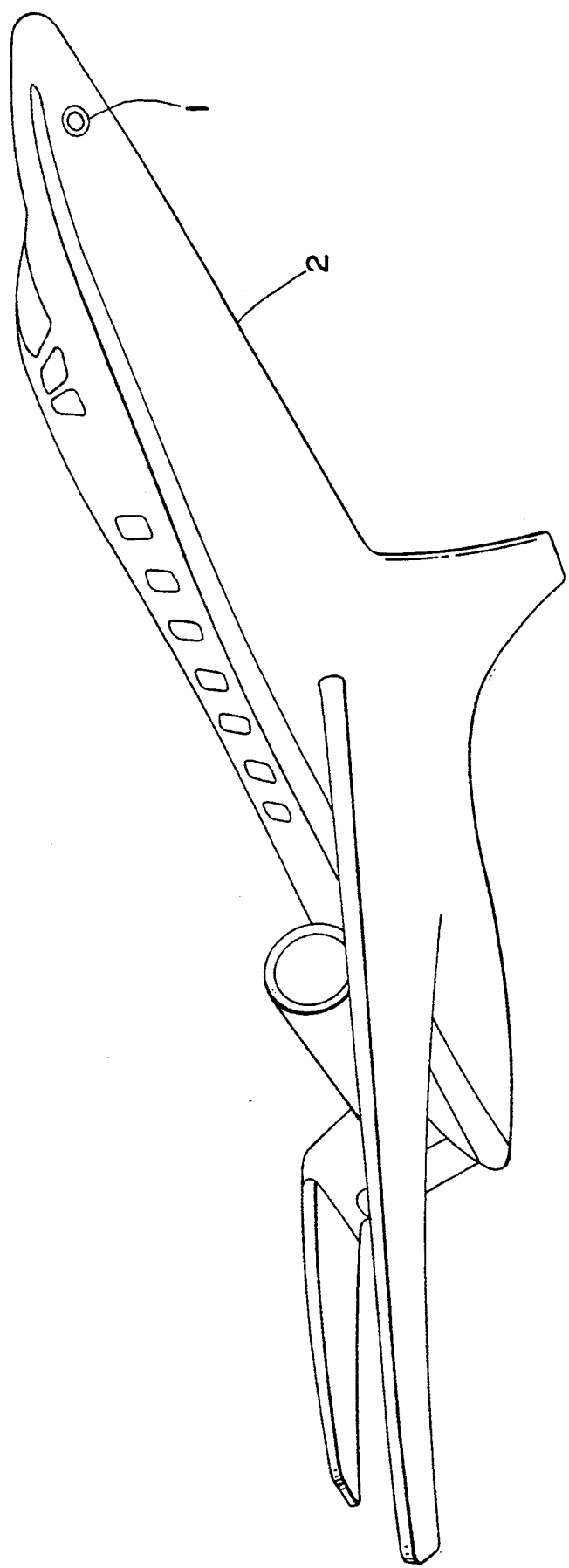
FIG. 1 is a perspective view of an airplane showing the landing light of the present invention mounted thereupon.
Figure 2:
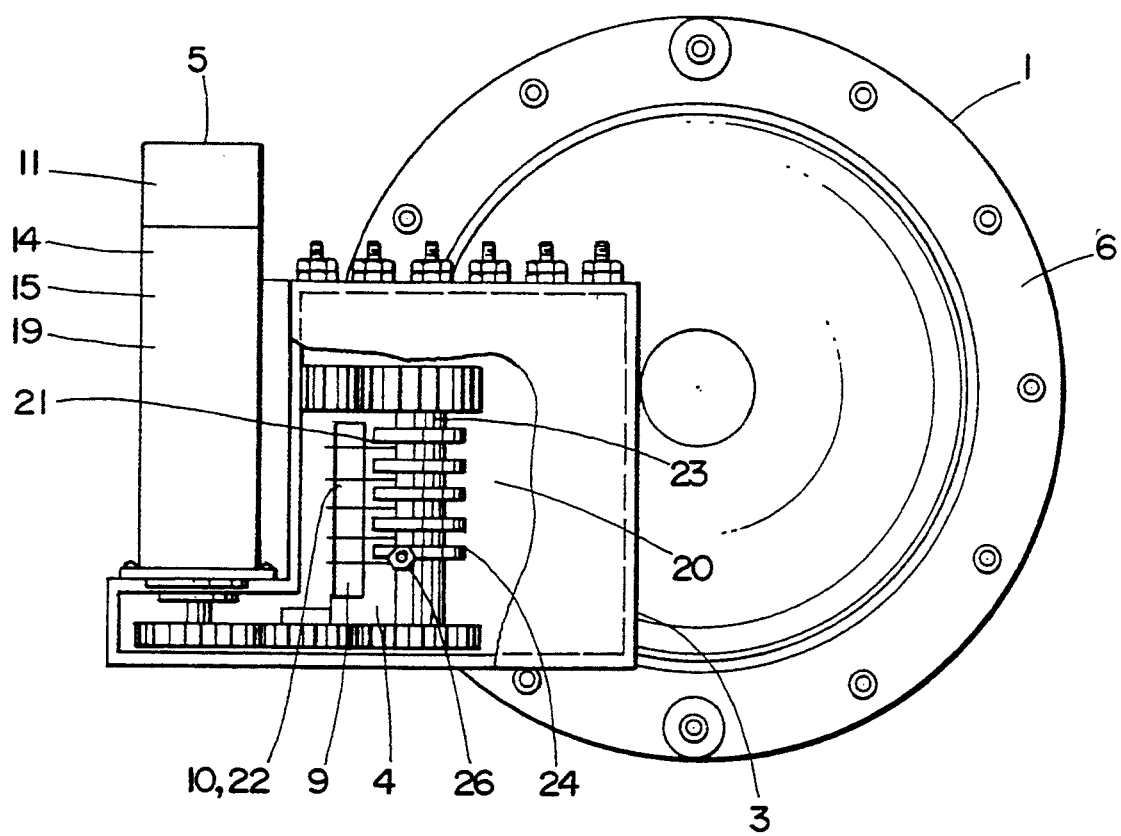
FIG. 2 is a plan view of the landing light of the present invention.
Figure 3:
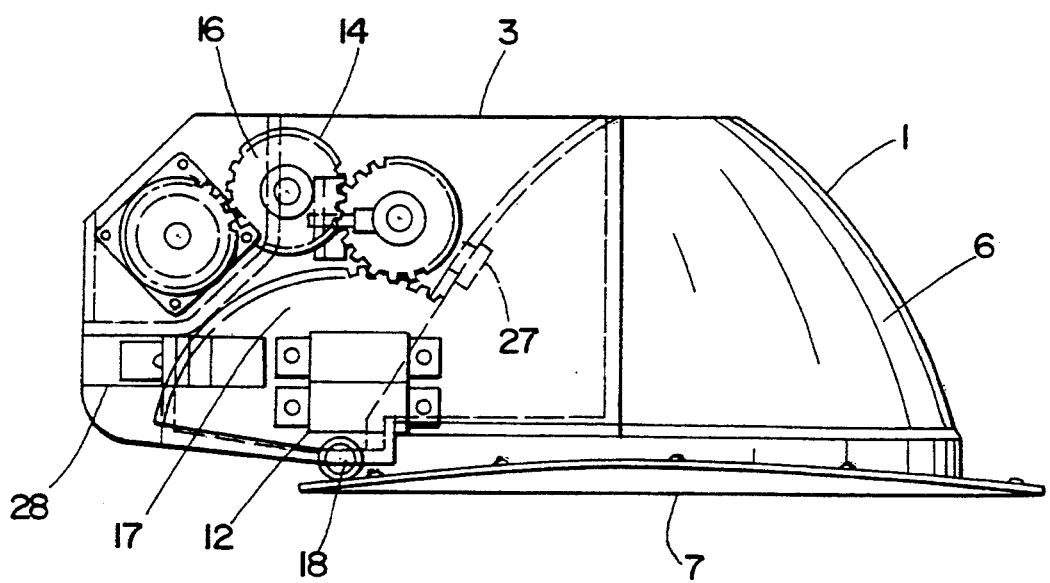
FIG. 3 is a side elevational view of the landing light of the present invention.

In a preferred embodiment of the invention, the landing light 1 consists of a base 3 for mounting to an aircraft 2. For example, the base may be mounted to the fuselage of an airplane, forward of the cabin as shown in FIG. 1. The base 3 houses control means 4 and drive means 5. An aluminum lamphead 6, partially enclosing conventional lamp means 7, is pivotally mounted to the base 3 as shown in FIGS. 2 and 3.

The lamphead 6 is connected to drive means 5. The drive means 5 pivots the lamphead 6 over a range of operational positions, from a retract position defining a first angle, through a first landing position defining a second angle and a second landing position defining a third angle, to a taxi position defining a fourth angle. The second angle is greater than the first angle, the third angle is slightly greater than the second angle, and the fourth angle is greater than the third angle.

The angles associated with the landing and taxi positions are adjustable as a group to optimize the illumination pattern for a given aircraft. The taxi position may be set over a range of 75 to 90 degrees from the retract position, with the landing positions having a corresponding range.

Figure 4:
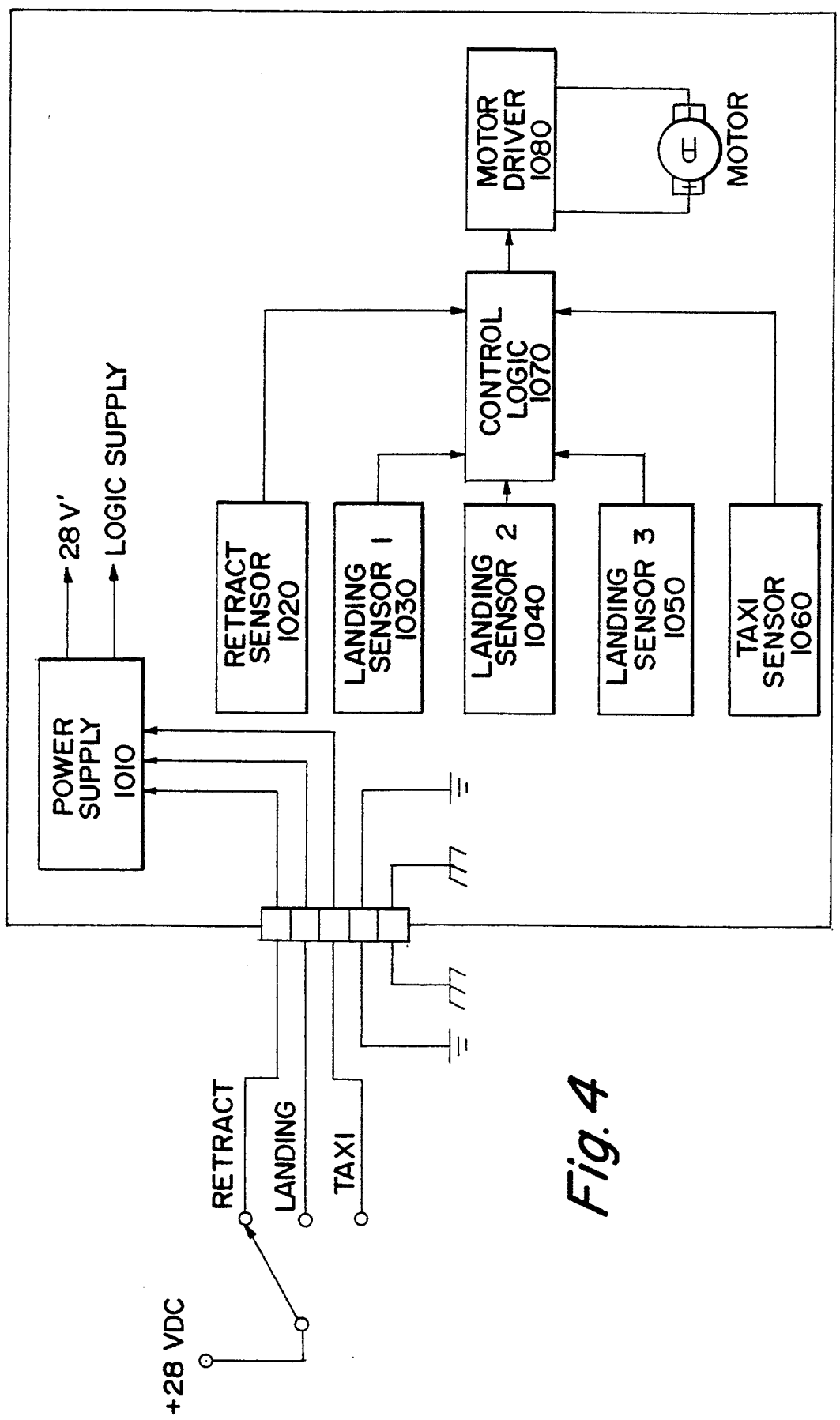
FIG. 4 is a diagrammatical representation of the control means of the present invention.
Figure 6A:
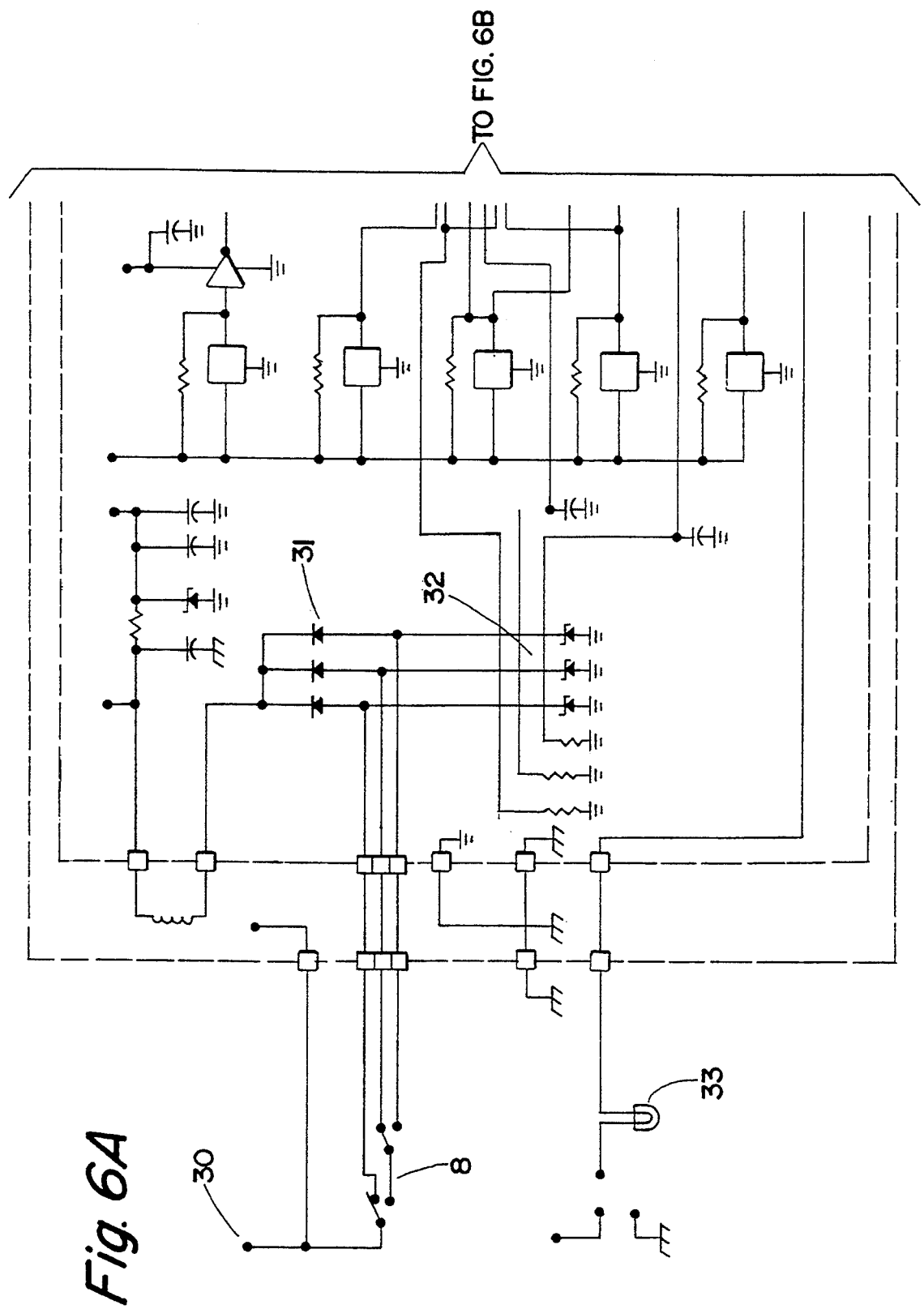
FIG. 6 is a schematic representation of the control means of the present invention.
Figure 6B:
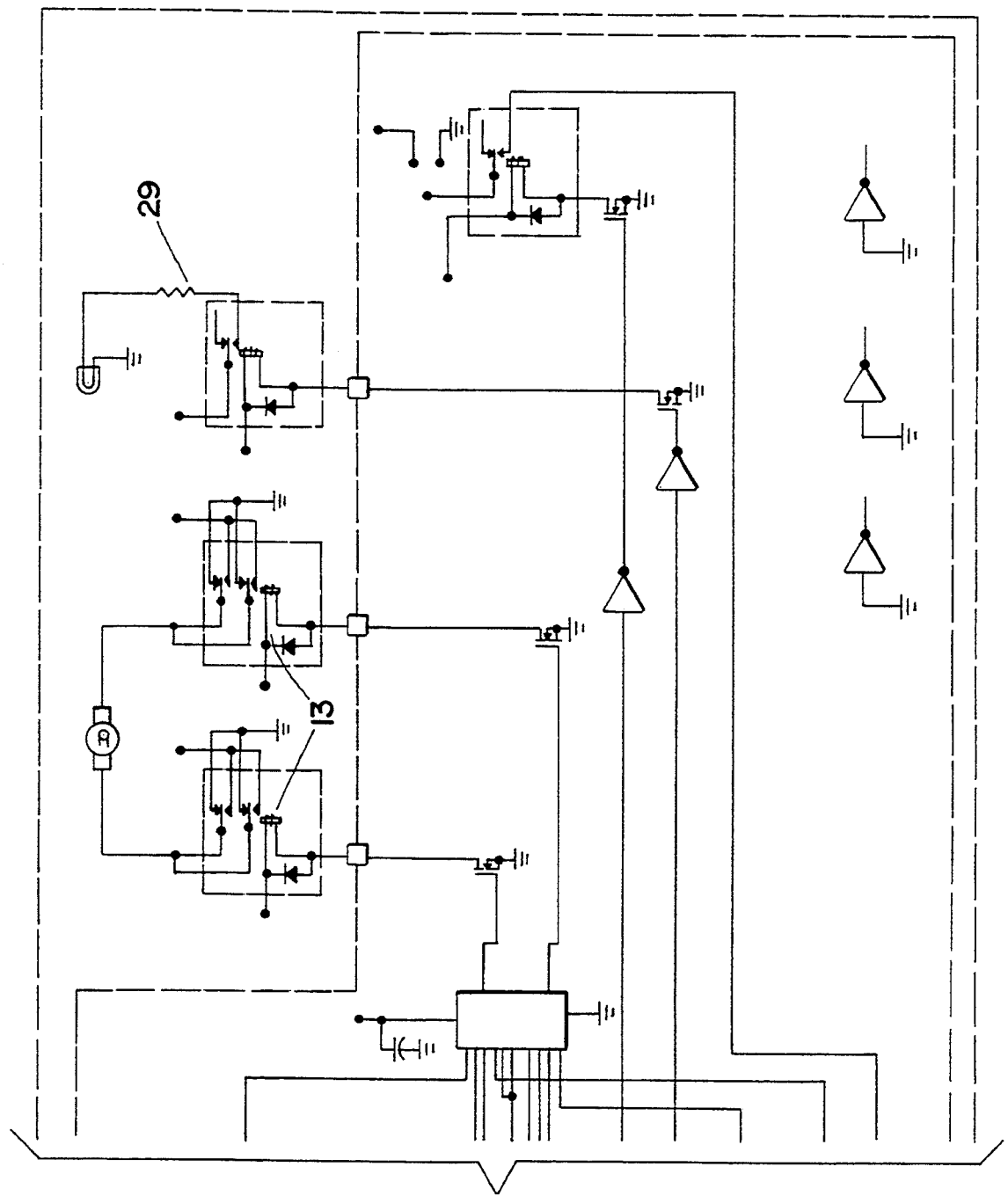

A select switch 8, accessible to the pilot, selects a mode corresponding to a desired operational position of the lamphead. The switch modes preferably include a retract mode, a landing mode, and a taxi mode. The select switch 8 may actuate control means 4 comprising a magnetic switch array 9 and a control circuit 10. The switch array 9 detects an actual position of the lamphead 6. When the lamphead 6 is not in the desired position, the control circuit 10 actuates the drive means 5, pivoting the lamphead 6 toward the desired position until the switch array 9 detects that the lamphead 6 is in the desired position. When the switch array 9 detects that the lamphead 6 is in the desired operational position, the control circuit 10 turns off the drive means 5. The control means 5 is shown in greater detail in FIGS. 4 and 6.

The drive means 5 preferably includes a reversible motor 11 that normally operates at 28 volts DC. The motor 11 may be a continuous duty, permanent magnet motor with brush-type commutation having a no load speed of 5,500 RPM and a no load current of 0.25 amps. The control means 4 may include a pair of single pole-double throw relays 12 for actuating and turning off the drive means. A first relay actuates the drive means in a first direction while a second relay actuates the drive means in a second direction. MOSFET transistors 13 may be provided between the relays 12 and the control circuit 10.

The drive means 5 may include gear reduction means 14 to reduce the motor speed and increase the torque. The gear reduction means 14 comprises a planetary gear train 15 and a spur gear reduction 16. The planetary gear train 15 preferably reduces the motor speed from 5,500 RPM to 5.5 RPM, a reduction of 940 to 1, and increases the output torque at 5.5 RPM to 175 inch-ounces. The output of the planetary gear train 15 drives a spur gear reduction 16 preferably having a ratio of 3.2 to 1. The output of the spur gear 16, attached to a sector gear 17 on the lamphead, drives the lamphead 6 about a pivot point 18.

The drive means 5 also may include dynamic and mechanical braking means 19. The dynamic braking means may be actuated when the connection of either relay 12 to the motor 11 is discontinued. The mechanical braking means may be actuated when voltage is removed from the brake coil of the motor, causing friction between the brake lining and the flywheel, and preventing motion of the motor and attached gear. The mechanical, or holding, braking means preferably has a static holding torque of at least 2.0 inch-ounces.

The control means 4 preferably includes an actuator wheel assembly 20 connected to the drive means 5. The actuator wheel assembly 20 includes a plurality of magnets 21 that actuate the magnetic switch array 9. The position of each of the plurality of magnets 21 on the actuator wheel assembly 20 may be adjusted to correspond to an operational position of the lamphead 6.

The magnetic switch array 9 may be mounted to a circuit board 22 in proximity to the actuator wheel assembly 20. The actuator wheel assembly 20 may be mounted on the output shaft 23 of the planetary gear train 15. The output shaft 23 of the planetary gear train 15 preferably rotates the actuator wheel assembly 20 at 3.2 times the speed of the lamphead 6. The actuator wheel assembly 20 comprises a plurality of actuator wheels 24. One of the plurality of magnets 21 is mounted on each actuator wheel 24.

The magnetic switch array 9 and the select switch 8 communicate with a control circuit 10. The control circuit 10 communicates with the appropriate drive relay 12 to actuate the drive means 5 when the magnetic switch array 9 detects that the lamphead 6 is not in the desired position. When the lamphead 6 reaches the desired position, a magnet 21 on the actuator wheel assembly 20 rotates into proximity with the switch array 9, actuating a switch in the array and causing the control circuit 10 to turn off the drive means 5.

Specifically, when the select switch selects the retract mode, the switch array causes the control circuit to actuate the drive means, pivoting the lamphead toward the retract position when the switch array detects that the lamphead is not in the retract position. When the lamphead reaches the retract position, the actuator actuates a switch in the array, causing the control circuit to turn off the drive means. When the select switch selects the taxi mode, the switch array causes the control circuit to actuate the drive means, pivoting the lamphead toward the taxi position when the switch detects that the lamphead is not in the taxi position. When the lamphead reaches the taxi position, the actuator actuates a switch in the array, causing the control circuit to turn off the drive means.

The control means operates similarly when the select switch selects the landing mode. The switch array causes the control circuit to actuate the drive means, pivoting the lamphead toward the first landing position when the switch detects that the lamphead is positioned at an angle less than the second angle, and toward the second landing position when the switch detects that the lamphead is positioned at an angle greater than the third angle. When the lamphead reaches either landing position, the actuator actuates a switch in the array, causing the control circuit to turn off the drive means. The switch array also causes the control circuit to turn off the drive means to prevent the lamphead from pivoting between the first landing position and the second landing position.

The foregoing embodiment provides means not only to drive the lamphead to the desired position, but also to restore the lamphead to the desired position if the lamphead drifts away from that position in response to mechanical forces such as turbulence.

Figure 5:
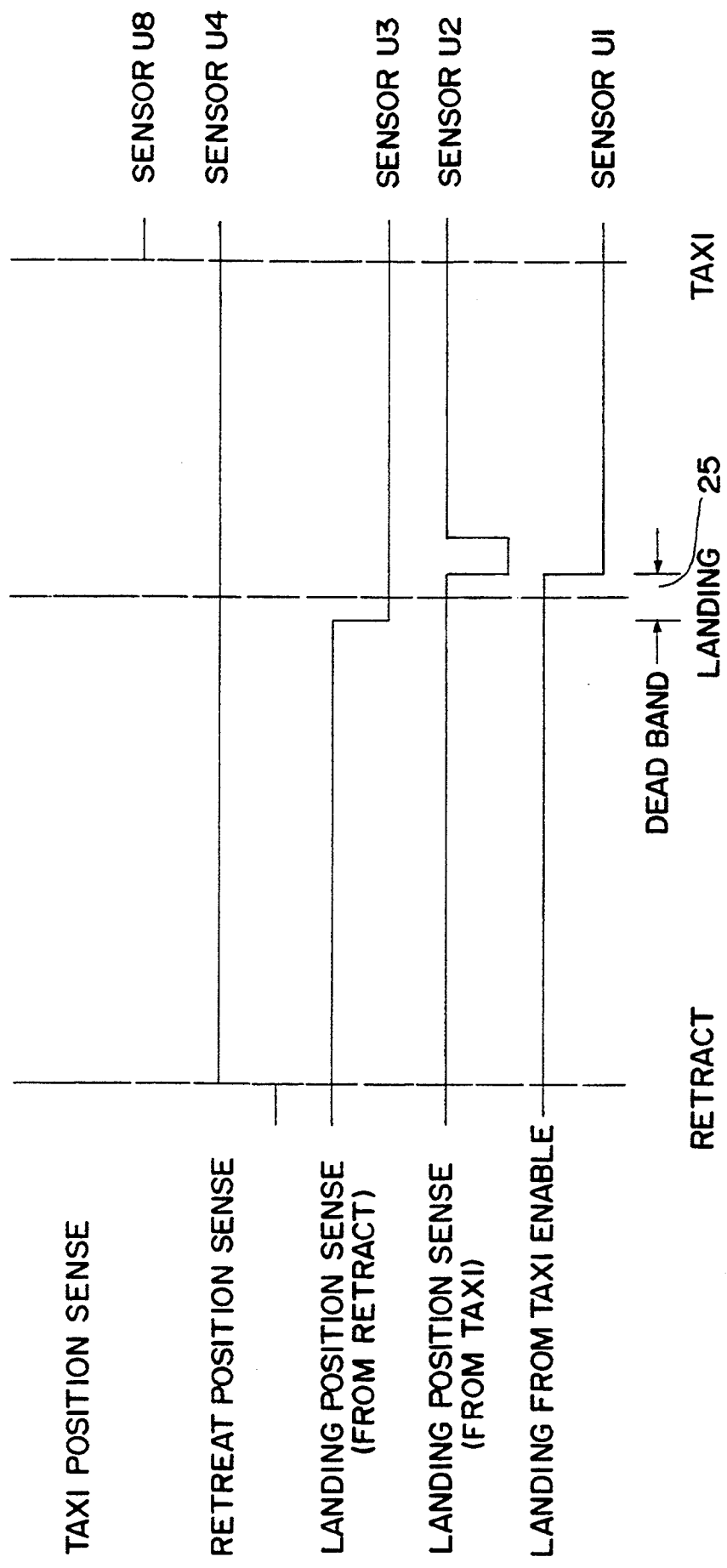
FIG. 5 is a diagrammatical representation of the magnetic switch timing diagram of the present invention.

The foregoing arrangement results in a dead band 25 between the first and second landing positions as shown in FIG. 5. The dead band prevents the magnetic switch array 9 from continually cycling on and off as the lamphead 6 drifts away from the desired position, causing the motor 11 to oscillate about in search of a landing position. The dual landing position arrangement, with a dead band between the two landing positions, improves stability and minimizes motor and relay wear.

Each actuator wheel 24 may be independently adjusted by an adjustment screw 26 on each of them. The wheel 24, bearing one of the magnets 21 thereupon, rotates about the output shaft 23 of the planetary gear train 15 when the adjustment screw 26 is turned, changing the actuation position of the wheel 24. When the adjustments are complete, a set screw secures the actuator wheel 24 to the output shaft 23 of the planetary gear train 15 in the desired position.

The actuator wheels 24 corresponding to the landing and taxi positions may be field adjustable as a group. A single adjustment screw 27 rotates as the group of actuator wheels on the output shaft 23, changing the position of the group with respect to the lamphead 6. This adjustment accommodates adjustment of the angles associated with the landing and taxi positions to optimize the illumination pattern for a given aircraft. The actuator wheel 24 corresponding to the retract position may not be field adjustable.

The lamp means 7 preferably comprises a 450 watt, 28 volt, sealed beam incandescent lamp. The control circuit 10 communicates with the lamp means 7 preferably by a single pole-double throw relay 28, turning off the lamp means 7 when the lamphead 6 is in the retract position and actuating the lamp means 7 when the lamphead 6 is not in the retract position. The lamp load may be arranged in series with a pair of thermistors 29 to reduce the inrush of current typical of incandescent lamps and prolong the life of the relay contacts.

The landing light 1 may operate on a 28 volt DC power source 30. The select switch 8 provides power from a selected mode to the drive means 5, the lamp means 7, and the control means 4. Steering diodes 31 connected to each mode prevent power from being fed back to an unselected mode. The control means 4 includes means for reducing the 28 volt supply to a level suitable for operating the control circuit 32.

Visual indicator means 33 may be provided to the cockpit to indicate the status of the landing light 1. In one embodiment of the invention, an indicator light is supplied with a 28 volt signal when the landing light is in the retract position and with ground at all other times. In another embodiment of the invention, an indicator light is supplied with a 28 volt signal when the landing light is at or past the landing position and with ground at all other times.

What is claimed is:

1. An aircraft landing light, comprising:
   a base;
   a lamphead pivotally mounted to said base;
   lamp means affixed within said lamphead;
   drive means associated with said lamphead;
   a select switch, said switch selecting a mode corresponding to a desired operational position of said lamphead; and
   control means in communication with said select switch, said control means comprising a magnetic switch array and a control circuit, a plurality of magnets, the position of each of said magnets corresponding to an operational position of said lamphead, said magnets actuating said magnetic switch array, said control circuit actuating said drive means to pivot said lamphead toward said desired position when said switch array detects the position of each of said magnets indicating that said lamphead is not in said desired position.

2. The light of claim 1 wherein said control circuit turns off said drive means when said switch array detects that said lamphead is in said desired position.

3. The light of claim 1 wherein said drive means comprises a reversible motor and said control means further comprises first and second relays for actuating and turning off said drive means, said first relay actuating said drive means in a first direction and said second relay actuating said drive means in the opposite direction.

4. The light of claim 1 wherein said lamphead comprises a retract position defining a first angle, a first landing position defining a second angle, said second angle greater than said first angle, a second landing position defining a third angle, said third angle slightly greater than said second angle, and a taxi position defining a fourth angle, said fourth angle greater than said third angle.

5. The light of claim 4 wherein said switch comprises a retract mode, a landing mode, and a taxi mode.

6. The light of claim 1 wherein said control circuit turns off said lamp means when said lamphead is in said retract position and actuates said lamp means when said lamphead is not in said retract position.

7. The light of claim 3 wherein said drive means comprises dynamic braking means, said braking means actuated when either of said relays turns off said drive means.

8. The light of claim 3 wherein said drive means comprises mechanical braking means, said braking means actuated when neither of said relays is actuated.

9. The light of claim 1 wherein said drive means comprises gear reducing means.

10. The light of claim 1, further comprising:
visual indicator means, said visual indicator means indicating a status of said lamphead.

11. The light of claim 1 wherein said lamp means is incandescent.

12. The light of claim 1 wherein said light is powered by a DC power supply.

13. An aircraft landing light, comprising:
a base;
a lamphead pivotally mounted to said base, said lamphead comprising a retract operational position, first and second landing operational positions, and a taxi operational position;
lamp means affixed within said lamphead;
drive means associated with said lamphead;
a select switch, said switch comprising a retract mode, a landing mode and a taxi mode, said switch selecting a mode corresponding to a desired operational position of said lamphead;
a control circuit in communication with said select switch;
a magnetic switch array in communication with said control circuit; and
an actuator wheel assembly connected to said drive means, said assembly comprising a plurality of magnets, each of said plurality of magnets comprising a position corresponding to an operational position of said lamphead, said magnets actuating said magnetic switch array, and said control circuit actuating said drive means to pivot said lamphead toward said desired position when said switch array detects that said lamphead is not in said desired position.

* * * * *